J. F. RISDON.
CAR FENDER.
APPLICATION FILED MAR. 17, 1909.
947,851. Patented Feb. 1, 1910.
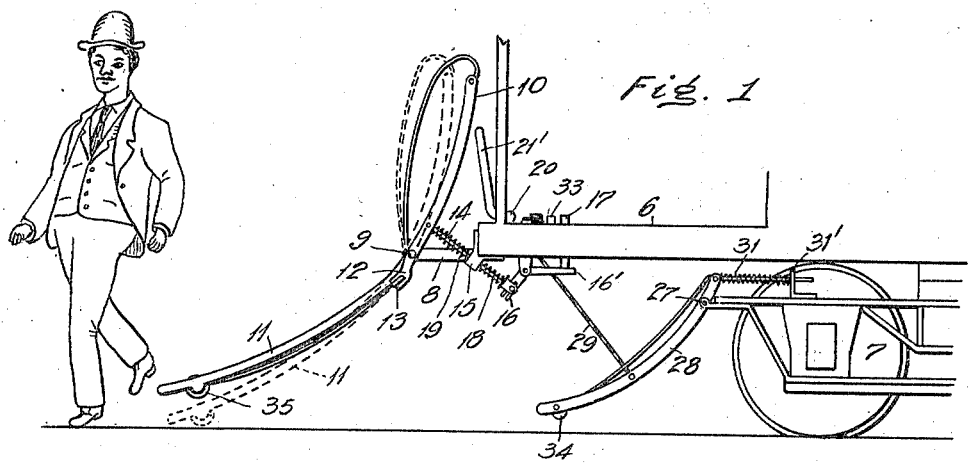
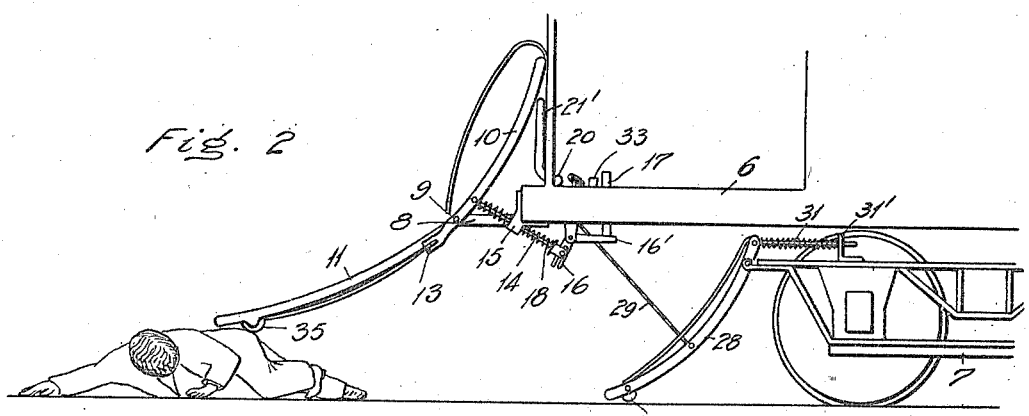
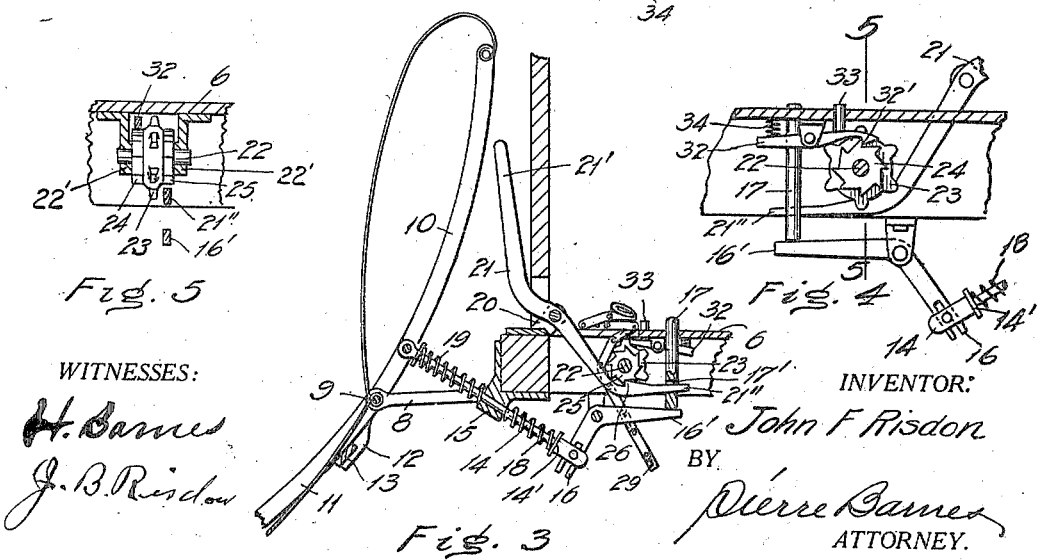
WITNESSES:
H. Barnes
J. B. Risdon
INVENTOR:
John F. Risdon
BY
Pierre Barnes
ATTORNEY.

UNITED STATES PATENT OFFICE.

JOHN F. RISDON, OF BREMERTON, WASHINGTON.

CAR-FENDER.

947,851.  Specification of Letters Patent.  Patented Feb. 1, 1910.

Application filed March 17, 1909.  Serial No. 484,061.

*To all whom it may concern:*

Be it known that I, JOHN F. RISDON, a citizen of the United States, residing at Bremerton, in the county of Kitsap and State of Washington, have invented certain new and useful Improvements in Car-Fenders, of which the following is a specification.

This invention relates to car fenders, and, more particularly, to certain improvements in the apparatus shown and described in United States Patent No. 884,683, which was issued to me April 14, 1908.

The object of my improvements, generally stated, is to simplify and render the fender easier to control and to increase its usefulness.

The invention consists in the novel construction and combination of parts, as will be hereinafter set forth, with reference to the accompanying drawings, whereof, Figure 1 is a vertical longitudinal view of a portion of a car with an embodiment of the invention attached thereto. Fig. 2 is a view similar to Fig. 1 but with the fender-parts in different relative positions. Fig. 3 is a vertical longitudinal section of certain of the fender parts illustrated in the positions in which they are represented in Fig. 1. Fig. 4 is a fragmentary view of parts shown in Fig. 3 but viewed in a reverse direction. Fig. 5 is a transverse vertical section through 5—5 of Fig. 4.

The reference numeral 6 represents the platform of the body of a street-car which is mounted upon wheel-trucks, such as 7. At the front of the car-body are brackets 8 for supporting a transverse rod 9 and to the latter are each hingedly connected the upper and lower fender parts 10 and 11. The upper fender part 10 is provided with arms, such as 12, which are arranged to be engaged by a latch-bar 13 for securing the two aforesaid parts together so that they will act as a single member, as explained in the aforementioned patent.

Secured to the upper fender part and to some distance above the hinge rod 9 is a rod 14 which extends downwardly toward the rear and through a sleeve member 15 which is rigidly secured to the car-body. The rod 14 at its rear end is operatively connected with the arm 16 of a bell-crank whose other arm 16' supports a pedal element 17, which extends upwardly through the platform of the car to be within convenient reach of the motorman's foot. Positioned upon the rod 14 is a spring 18 confined between said sleeve member 15 and a shoulder 14' upon the rod. Another spring 19 is positioned upon the rod to act oppositely upon the fender and against said sleeve member. These two springs are adjusted so as to coöperate to yieldingly retain the fender in its normal position, as indicated by full lines in Fig. 1.

Fulcrumed to a support 20 upon the car is a lever 21 having one arm 21' extending upwardly to the rear of the upper of said fender parts, while the other arm 21'' extends rearwardly through an aperture 17' in said pedal, as shown in Fig. 3.

22 is an arbor mounted for rotation in suitable bearings 22' (Fig. 5) provided upon the car-body and below the platform thereof. Upon the arbor is a sprocket wheel 23 and ratchet wheels 24 and 25, of which the latter is in the same transverse plane with the lever arm 21'' so that a detent 26 upon the arm will be engaged with the teeth of the ratchet wheel through the instrumentality of the pedal when yieldingly held in its uppermost position by power imparted from the spring 18 through the medium of the aforesaid bell-crank. The lever 21 is, through the agency of the spring 18, held normally in position to retain its arm 21' in the position in which it is shown in Figs. 1 and 3, that is to say, tilted forward to its maximum extent, as regulated by the interference of the other arm 21'' with its ratchet wheel 25 and at the same time have the arm 21' out of contact with the fender when the latter is in its normal position.

Hingedly connected at 27 to the truck frame 7 is a wheel guard 28 which is normally held in position to have its forward end at a predetermined height above the car track by a chain 29 whose links engage the teeth of the sprocket wheel 23. Beyond the wheel the chain passes through an opening in the car platform to be manipulated by the motorman when elevating the guard. A spring 31 is employed between a stop 31' upon the truck and the guard to cause the latter to be tilted downwardly upon the track as the chain 29 is allowed to pay out when the sprocket wheel therefor is released. A lever-pawl 32, see Fig. 4, is provided for the ratchet wheel 24 and is upon occasion engaged therewith by actuating a pedal attachment 33 against the action of a spring 34 which tends to maintain the detent 32' of this pawl in disengaged position with respect to the wheel. The pedal attachment 33 projects through the car platform and is disposed to be in proximity to the pedal element 17 in order that the motorman may depress both of them simultaneously if desired.

Near the front ends of the wheel guard 28 and the fender-part 11 are rollers which are respectively designated by 34 and 35 to serve as rotary traction elements when the same are brought into contact with the road-bed or track.

Operation of the invention: Normally the fender and wheel guard are maintained to be in the positions whereat they are represented by full lines in Fig. 1 and with the advance end of each sufficiently above the track as to obviate striking the same in the progress of the car from any cause, as for example, the rocking of the car, or in ascending steep grades. Under such conditions an object encountered by the fender from in front and above the lower edge of the same will cause the fender to be tilted downwardly, as represented by broken lines in Fig. 1, and against the power of the spring 18. Should, however, an object be encountered by the fender from below, then the fender would be tilted upwardly, as represented in Fig. 2, to allow the fender to pass thereover and afford the wheelguard, which meanwhile has been tilted downwardly, to act as a scoop to pick up the object. This function of the guard is accomplished by the fender, in being tilted up, carrying the lever-arm 21' to the rear and thus forcibly swerving the arm 21'' to withdraw its detent 26 from engagement with the ratchet wheel 25; whereupon the sprocket wheel 23 is released and the spring 31 asserts itself to cause the tilting down of the guard.

When the just-described functions of the fender and wheel-guard have been performed, the former is restored to its normal condition by the coöperating actions of the springs 18 and 19, while the latter is manually raised into normal position by means of the chain 29 and retained at a selected height by engagement with the teeth of the sprocket-wheel 23. The actions just described are performed automatically by the displacement of the fender, but the same results may be attained by the motorman as follows: To effect the downward tilting of the fender he exerts a pressure with his foot upon the pedal 17 which causes the bell-crank 16—16' to exert a thrust through the rod 14 which will cause the tilting downwardly of the fender part and concurrently the pedal actuates the lever 21 to disengage the ratchet wheel to allow the spring 31 to tilt the wheel guard downwardly, as before explained. Oftentimes it is advantageous to lower the fender independently of the guard. This is accomplished by the motorman pressing downwardly with his foot upon both the pedals 33 and 17 the former acting to cause the lever-pawl 32 to be operative, and the other actuating the fender, as aforedescribed.

Having described my invention, what I claim, is—

1. The combination with a car having a fender tiltably connected with the forward end thereof and a wheel guard tiltably connected with the truck of said car, of means for yieldingly holding said fender to have its advance end elevated at some distance above the track-bed, a spring acting to maintain the forward end of said guard in contact with the track-bed, devices acting in opposition to said spring for normally holding said guard above the track-bed, means actuated by the upward tilting of the fender for releasing said devices to allow said spring to become operative, and means whereby the upward tilting of the fender may be accomplished without effecting the release of said devices or the actuation of said spring.

2. The combination with a car having a fender tiltably connected therewith, a wheel guard tiltably connected with the truck of said car, a spring acting upon the wheel guard for tilting the same into contact with the track-bed, and means for securing the wheel-guard at various elevations with respect to the track-bed, of connections between said means and the fender whereby certain movements of the fender will normally effect the release of said securing means, and manually controlled means whereby such movements of the fender may be accomplished without disturbing the securement of said securing means.

3. In an apparatus of the class described, the combination with a car, a fender, a support carried by the car and to which the fender is hinged, a spring acting to yieldingly retain the fender so as to be at some distance above the track-bed, and a lever, of a wheel-guard tiltably connected to the car-truck, means for holding said wheel-guard normally suspended above the car-track and comprising an arbor, a sprocket wheel thereon, a chain connected to the wheel-guard and engaging the sprocket wheel, a ratchet wheel, a lever provided with a detent engaging the ratchet wheel, a bell-crank lever pivotally attached to the car, connections between the last named lever and the fender, a pedal engaging both the aforesaid levers, and a spring acting to tilt the guard into juxtaposition with the track-bed when the first-named lever is actuated by the fender.

4. In apparatus of the class described, the combination with a car, a fender, a support carried by the car and to which the fender is hinged, a spring acting to yieldingly retain the fender so as to be at some distance above the track-bed, a wheel-guard tiltably connected with the car-truck, a spring acting to tilt the guard into juxtaposition with the track-bed, an arbor upon the car and having a sprocket wheel and a ratchet wheel mounted thereon, and said wheels, of a chain engaging with said sprocket wheel and connected with said guard, a lever arranged to be engaged by the fender in the upward tilting of the latter and provided with a detent for engagement with said ratchet wheel and a pedal influenced by said spring to retain such lever in engaged condition with respect to the ratchet wheel and also to retain the lever in position to be tripped therefrom through the upward tilting of said fender.

5. In apparatus of the class described, the combination with a car, a fender, a support carried by the car and to which the fender is hinged, of a wheel-guard tiltably connected with the car-truck, a spring acting to tilt the guard into juxtaposition with the track-bed, an arbor upon the car, a sprocket wheel and a ratchet wheel mounted upon the arbor, a chain engaging with said sprocket-wheel and connected to said guard, a lever provided with a detent for engagement with said ratchet wheel, a spring acting to yieldingly retain the fender at some distance above the track bed and also serving to retain such lever in engaged condition with respect to the ratchet wheel, and means whereby the fender may be caused to operate independently of the wheel-guard.

6. In apparatus of the class described, the combination with a car, a fender tiltably connected with the front end of the car and a wheel-guard tiltably connected with the car-truck, of an arbor, a sprocket-wheel on the arbor, two ratchet wheels on the arbor, a connection between the sprocket wheel and the wheel-guard, a spring acting to tilt the wheel-guard downwardly, a spring acting to retain the fender at some distance above the track-bed, a bell-crank operatively connected with the fender, a pedal for influencing the fender through the medium of said bell-crank, a lever provided with a detent for engaging one of said ratchet wheels and operatively connected with said pedal, said lever being arranged to be engaged by the fender upon the upward tilting of the latter, a pawl-lever, and means for actuating the pawl-lever to effect the engagement of the same with the other of said ratchet-wheels.

JOHN F. RISDON.

Witnesses:
H. BARNES,
J. B. RISDON.